Oct. 7, 1958   R. L. ATKIN   2,855,015
TUBELESS TIRE RIM AND VALVE STEM ASSEMBLY
Filed June 16, 1955

INVENTOR.
RUPERT L. ATKIN.
BY

United States Patent Office 2,855,015
Patented Oct. 7, 1958

2,855,015

TUBELESS TIRE RIM AND VALVE STEM ASSEMBLY

Rupert L. Atkin, Grosse Pointe Woods, Mich., assignor to Kelsey-Hayes Company, a corporation of Delaware Application June 16, 1955, Serial No. 515,989

6 Claims. (Cl. 152—427)

The invention relates to tubeless tire rim and valve stem assemblies and has for one of its objects to so construct such an assembly that the valve stem may be readily secured to the rim.

The invention has for another object to construct the securing means so that it exerts a force maintaining an airtight seal between the rim and valve stem.

A still further object is to provide an improved method of applying a valve stem assembly to a tubeless tire rim in such a manner that the stem assembly is air-tight sealed at its junction with the rim.

With these and other objects in view the invention resides in the novel features of construction as more fully hereinafter set forth—

Figure 1:
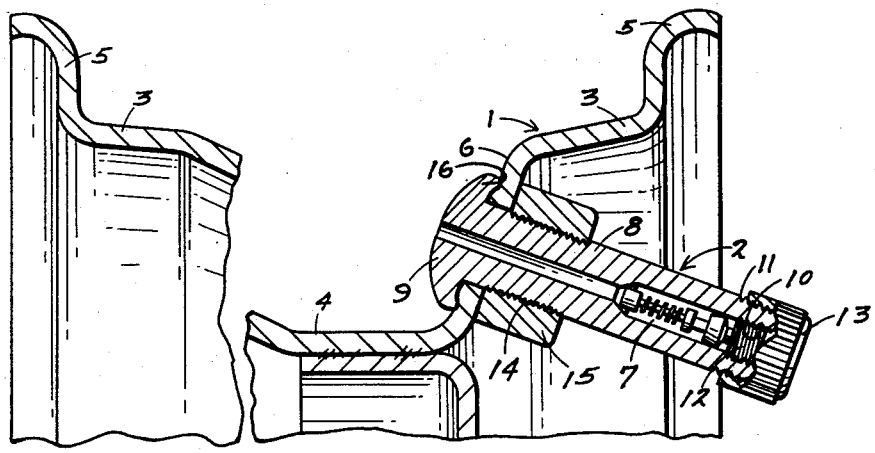
Figure 1 is a transverse sectional view of a tubeless tire rim and valve stem assembly.

As shown in Figure 1, the tubeless tire rim and valve stem assembly comprises the rim and the valve stem 2. The rim as shown is of the drop-center type having the bead seats 3, the well 4 between the bead seats, and the tire retaining flanges 5 extending from the bead seats. The well has the side walls 6 which connect into the bead seats and to one of which the valve stem 2 is permanently secured.

The valve stem 2 is hollow, it being provided with a central or axial passage 7 therethrough. The valve stem has the shank 8 and the head 9 at one end of the shank. The shank extends through a circular opening in the associated side wall 6 and the head is located inside the rim and more particularly the well. The shank is formed at the end opposite the head with the internal and external threads 10 and 11 respectively for engagement with a valve core 12 and a valve cap 13 respectively. The stem is also formed adjacent the outside of the side wall 6 with the knurled circumferentially extending annular projections 14 over which is crimped the locking collar 15. The head is formed at the side adjacent to the side wall with an endless annular bead 16 which is forced into airtight engagement with the side wall during the crimping of the collar. The crimping operation is accomplished by a suitable tool having a chuck engageable with the external threads 11 and adapted to exert pull on the valve stem and also having an anvil movable toward the side wall and engageable over the collar and adapted to swage the collar over the projections and into the annular grooves formed by the projections and to also swage the collar tightly against the outside of the side wall. The force exerted by the tool is such that the annular bead on the head preferably bites into the side wall to effectively form an airtight seal.

Figure 2:
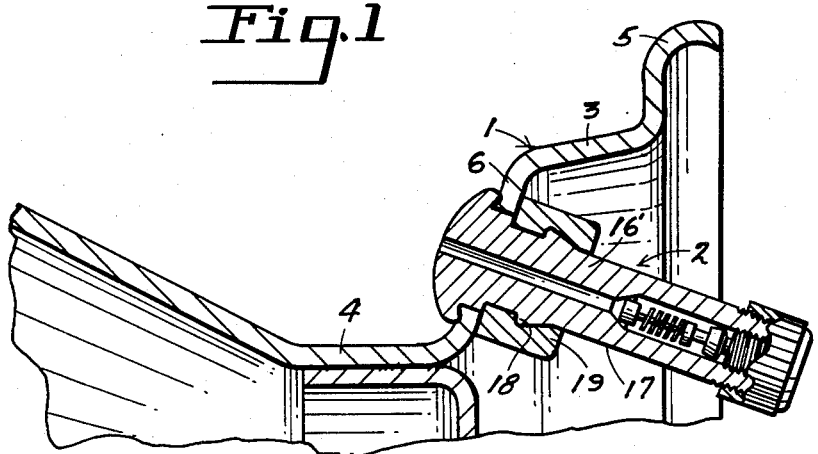
Figures 2 and 3 are similar views of modified constructions.

In the modification illustrated in Figure 2 the tubeless tire rim and valve stem assembly is essentially the same as that of Figure 1 but differs in forming the shank 16' of the valve stem 17 with the single circumferentially extending annular projection 18 over which the locking collar 19 is crimped. The manner of securing the valve stem 2 to the tire rim is the same as that used in securing the valve stem to the tire rim of Figure 1.

Figure 3:
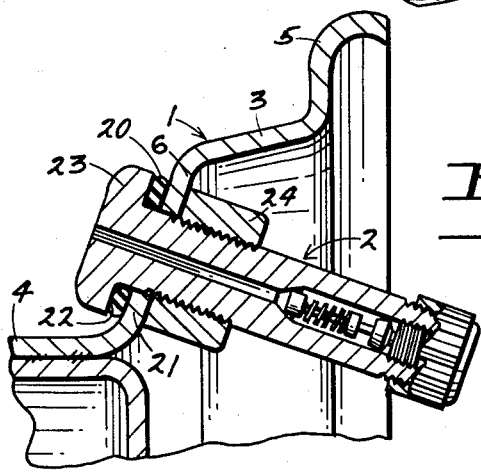

Figure 3 discloses another construction of tubeless tire rim and valve stem assembly which is generally the same as that of Figure 1 but differs in providing the annular sealing element 20 between the inside of the side wall 21 of the well of the rim and the annular flat face 22 of the head 23 of the valve stem. This sealing element is preferably a rubber O-ring. During the crimping of the locking collar 24 the sealing element is compressed and forms an airtight seal between the side wall of the rim well and the head of the valve stem.

The above tubeless tire rim and valve stem assemblies, in addition to being constructed to provide for readily and effectively securing the valve stems to the rims, are so constructed that the valve openings or holes in the rims may be substantially smaller than those heretofore made for receiving rubber valve stems so that these smaller openings or holes can be located in places in the rims unable to accommodate the larger openings or holes.

What I claim as my invention is:

1. A tubeless tire rim and valve stem assembly comprising a rim having a circular opening therethrough, a valve stem provided with a central passage therethrough and having a shank and a head at one end of said shank, said shank extending through the opening and being provided intermediate its ends with an external locking formation and at the opposite end with internal and external threads coaxial with said head for engagement with a valve core and a valve cap respectively, and a collar crimped on said shank at the side of said rim opposite said head in embedded and interlocked engagement about said formation and exerting a force maintaining an airtight seal between said rim and valve stem.

2. A tubeless tire rim and valve stem assembly comprising a rim having an opening therethrough, a hollow valve stem having a shank and a head at one end of said shank, said shank extending through the opening and being provided intermediate its ends with an external locking formation and at the end remote from said head with external threads coaxial with said head for engagement with a valve cap, and a collar crimped on said shank at the side of said rim opposite said head in embedded and interlocked engagement about said formation and exerting a force maintaining an airtight seal between said rim and valve stem.

3. A tubeless tire rim and valve stem assembly comprising a rim having an opening therethrough, a hollow valve stem having a shank and a head at one end of said shank which is provided with an endless annular bead, said shank extending through the opening and being formed adjacent to said rim and at the side thereof opposite said head with a circumferentially extending external projection, and a collar crimped on said shank over said projection, said collar having said projection embedded therein in interlocked relation thereto and exerting a force indenting said bead in said rim and maintaining an airtight seal between said rim and head.

4. A tubeless tire rim and valve stem assembly comprising a rim having an opening therethrough, a hollow valve stem having a shank, a head at one end of said shank, and external threads at an opposite end thereof coaxial with said head, said shank extending through the opening and being formed adjacent to and at the side of said rim opposite said head with a circumferentially extending external projection, an annular sealing element between said rim and head, and a collar crimped on said shank over said projection, said collar having said projection embedded therein in interlocked relation thereto and exerting a force compressing said sealing element between said rim and head to maintain an airtight seal between said rim and valve stem.

5. A tubeless tire rim and valve stem assembly comprising a rim having an opening therethrough, a hollow valve stem having a shank and a head at one end of said shank, said shank extending through the opening and being formed adjacent to and at the side of said rim opposite said head with a circumferentially extending external projection, said head being formed at the side adjacent to said rim with an endless annular bead engageable with said rim, and a collar crimped on said shank over said projection and exerting a force maintaining said bead in airtight engagement with said rim.

6. A method of assembling to a tubeless tire rim a tubular valve stem characterized by an annular beaded head at one end, a thread at its opposite end and an external locking formation intermediate said ends, comprising the steps of inserting said stem in an opening in said rim, with the bead of said head in engagement with a wall of the rim surrounding the opening, sleeving a collar on said stem on the side of said wall opposite said head, and crimping said collar to said stem in a manner to engage said collar with said wall to embed said bead in said wall and said locking formation in said collar, by exerting axial forces acting in one direction on said collar and in the opposite direction on said stem end thread.

References Cited in the file of this patent
UNITED STATES PATENTS

| | | |
|---|---|---|
| 1,896,028 | Burvenick | Jan. 31, 1933 |
| 2,563,787 | Keefe | Aug. 7, 1951 |
| 2,731,065 | Powers | Jan. 17, 1956 |